United States Patent Office.

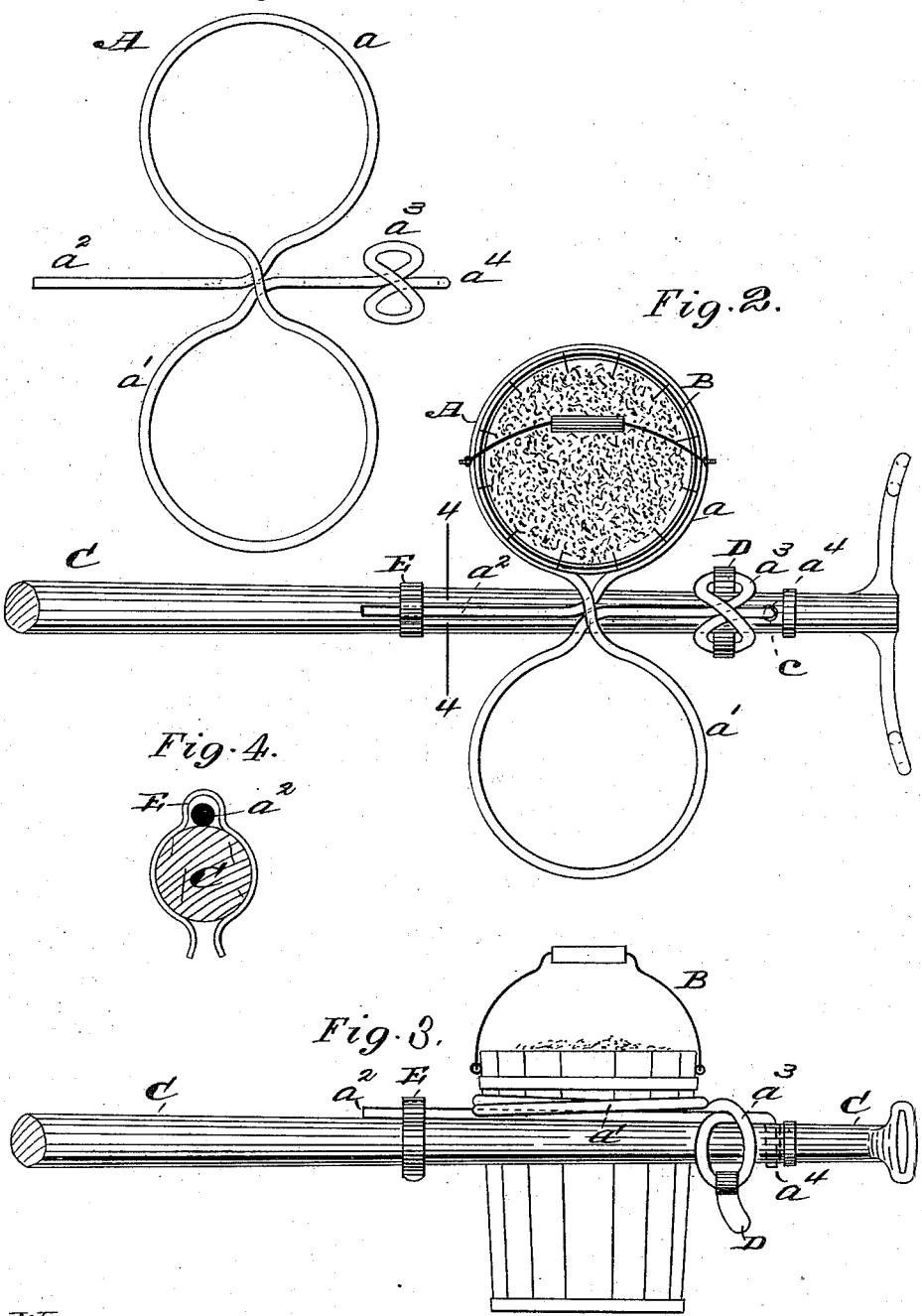

JOHN MURRAY, OF ST. LOUIS, MISSOURI.

NOSE-BAG SUPPORT FOR VEHICLES.

SPECIFICATION forming part of Letters Patent No. 383,823, dated May 29, 1888.

Application filed October 31, 1887. Serial No. 253,898. (No model.)

*To all whom it may concern:*

Be it known that I, JOHN MURRAY, of St. Louis, Missouri, have made a new and useful Improvement in Feed Attachments for Wagons and Carriages, of which the following is a full, clear, and exact description.

This invention is a light, compact, portable device adapted to be attached to the forward end of the pole of a wagon or carriage, and when attached to uphold a bucket or a pair of buckets or other vessels in such a position as to enable the horse or horses while harnessed to the vehicle to feed from them.

The annexed drawings, making part of this specification, illustrate the mode of carrying out the improvement.

Figure 1 is a plan of the device. Fig. 2 is a plan showing the device attached to a wagon or carriage pole and supporting a feed-bucket at one side of the pole. Fig. 3 is a side elevation, and Fig. 4 is a vertical cross-section on the line 4 4 of Fig. 2.

The same letters of reference denote the same parts.

The essential features of the improved attachment A, Fig. 1, are the holder or holders $a\ a'$ for the feed-buckets B and the means by which the holders are secured to the pole C. The holders are frames, preferably round in form, and the part for securing them to the pole is a projection at the inner side of the holder, or between the holders when a pair of holders are used, capable of being hooked onto or into the pole or an attachment upon the pole, or of being clasped around the pole.

The preferable mode of carrying out the improvement and of attaching it to the pole is as follows: The attachment A is made of wire. Beginning with the end $a^2$, the wire is bent around to form the generally circular-shaped bucket-holder $a$, after which the wire is extended and bent to form the other similarly-shaped holder $a'$, after which the wire is further extended and bent and crossed and folded, substantially as shown in Figs. 1, 2, and 3, to form by one end the extension $a^2$ and at the other a clip-like part, $a^3$, located and shaped to fit down upon and, by means of a strap, D, Figs. 3 and 4, be clasped around or to the pole; and, finally, the wire is preferably further extended to form a downwardly-projecting end, $a^4$, adapted to be inserted in a perforation, $c$, in the pole. The attachment is secured to the pole to the best advantage by passing the end $a^2$ through a spring-clip, E, or any equivalent part—such as a screw-eye—upon the pole, and then strapping the clip $a^3$ to the pole, and at the same time the end $a^4$, if used, is passed into the perforation $c$.

I desire not to be restricted to the strap for fastening the clip $a^3$ to the pole, nor to the clip E for fastening the end $a^2$ to the pole, nor is it wholly essential to secure the attachment to the pole both in front and in rear of the holders $a\ a'$; but it is desirable so to secure it.

The attachment A, when not required, can be detached from the pole.

The attachment, in addition to serving as a holder for any feed-vessel—such as the bucket or buckets B—can be utilized to suspend a hay-bag from. The attachment can also be transferred to a stall in a stable, and, when suitably therein supported, there serve to uphold a feed vessel or vessels. A clip, $a^3$, and strap D may be used in the place of the end $a^2$ and clip E. The end $a^4$ may be threaded to receive a thumb-nut below the pole.

I claim—

1. The herein-described feed attachment for wagons, &c., consisting of the holder A, made of wire and having a circular-shaped receptacle for the feed-bucket, the respective ends of the wire being crossed and folded and extending in opposite directions, and adapted for being secured to the wagon-pole.

2. The herein-described feed attachment A, made of wire and bent to form on either side a circular holder, $a$ and $a'$, the ends $a^2$ and $a^3$ of the wire being extended in opposite directions to form means for attaching the device to a carriage, substantially as described.

JOHN MURRAY.

Witnesses:
C. D. MOODY,
B. F. REX.